July 28, 1959
C. H. SCRUGGS
2,896,575
QUAIL FEEDER
Filed March 10, 1958
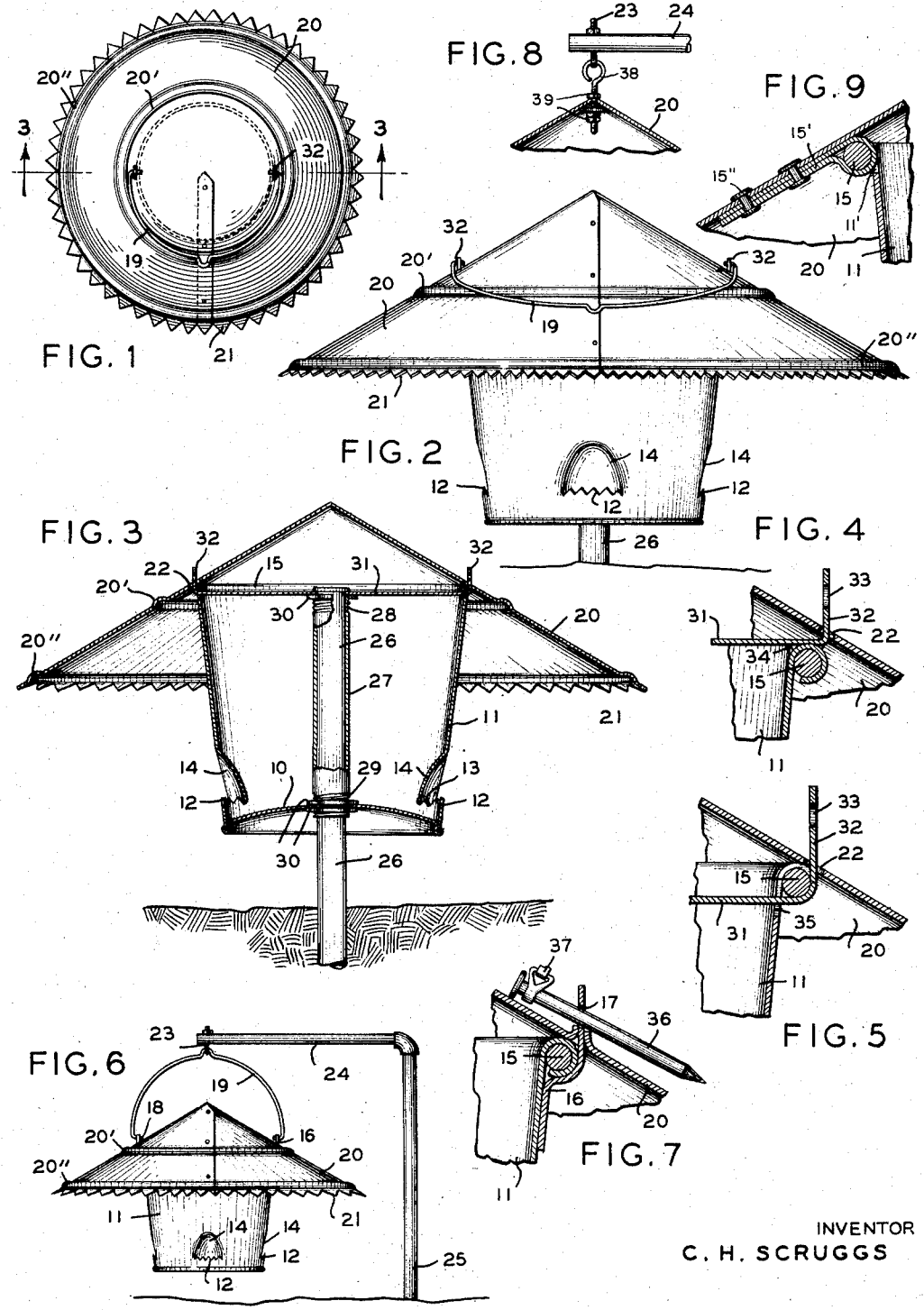
INVENTOR
C. H. SCRUGGS
BY A. Yates Dowell
ATTORNEY United States Patent Office 2,896,575
Patented July 28, 1959

2,896,575
QUAIL FEEDER
Charles H. Scruggs, Tampa, Fla.
Application March 10, 1958, Serial No. 720,182
6 Claims. (Cl. 119—51)

This invention relates to the care and feeding of life in the country and on the farm, both animal and fowl, domestic and wild, and more particularly to a feeder designed to supply or make available feed for quail and the like and which feeder is an improvement over that illustrated, described and claimed in Patent 2,666,415 granted January 19, 1954.

The present invention is a feeder suitable for quail, pheasant, turkeys or the like, constructed in a similar manner to that of the structure of Patent 2,666,415 at a relatively low cost to provide food for certain birds and small animals and designed to effect savings in food by excluding undesirable larger birds and animals which frequently upset the feeder in an attempt to gain access thereto.

It is an object of the invention to provide a feeder which will insure the feed reaching quail and other small animals for which it was intended, which is simpler, less expensive and therefore more competitive both in cost and in the waste of feed on animal life for which it was not intended, as well as a feeder requiring minimum labor to produce from readily available materials, which will afford free access to the feed by quail and other small animals and fowl, but will offer resistance to the feed by the insertion of the paws into the feeder openings to withdraw feed by larger and uninvited guests due to the piercing nature of the jagged walls defining the feed openings.

Another object of the invention is to provide a feeder which can be supported either on a post and retained in a fixed or stationary manner or which can be suspended so that it is allowed to swing and prevent stock from obtaining pushover leverage against the same as well as a feeder which can be manufactured from a conventional pail with or without bail brackets and a bail ordinarily used for lifting and transporting the same.

A further object of the invention is to provide a feeder composed of a container, a conical cover or roof which can be moved relative to the container to allow the introduction of feed, and supporting means for the container and cover with the periphery of the cover or roof provided with relatively sharp notches or saw-teeth which will pierce an intruder and with such container having openings likewise provided with sharp piercing points in the edges of the walls forming the openings with such points designed to discourage insertion of the paws of an animal or use by unauthorized animals and fowl.

A still further object of the invention is to provide a structure of the character indicated which can be conveniently and easily made of relatively few parts including a preformed container or pail, a flat piece of metal to provide a roof, a support of tubing and a suspending fastener.

Other objects and advantages of the invention will be apparent from the following description taken in conjunction with the accompanying drawing wherein:

Fig. 1 is a top plan view illustrating one application of the invention;

Fig. 2 a side elevation;

Fig. 3 a vertical section on the line 3—3 of Fig. 1;

Figs. 4 and 5 enlarged fragmentary vertical sections;

Fig. 6 a side elevation of a modified form of the invention mounted to swing;

Fig. 7 an enlarged fragmentary vertical section of the roof latch;

Fig. 8 a modified form of suspension means; and

Fig. 9 an enlarged fragmentary vertical section showing a hinge means.

Briefly stated, the quail feeder of the present invention is intended for use on the farm, ranch, grove, yard, hunting-ground or other area, for positively providing and supplying feed for consumption by quail, as well as a device which is stock-, vermin-, and weatherproof and capable of being easily installed and transferred to another location, as well as a container with a removable hood, and supporting means for supporting the feeder in a stationary or swinging position.

With continued reference to the drawing, the feeder of the present invention comprises a bucket or pail which may have a convex bottom 10 so that feed such as grain therein will gravitate from the center towards the circumference and with the outer edge of the bottom connected to an annular sidewall 11 which flares slightly from its bottom to its top. The sidewall 11 is provided near its lower edge with feed openings defined by upwardly disposed relatively sharp teeth or projections 12, simulating saw teeth and a series of corresponding depending teeth 13, spaced from the teeth 12 by an instruck portion 14.

By utilizing a pail with a convex bottom, grain within the pail will tend to gravitate from the center towards the outer wall 11 in which the openings are provided. By spacing the teeth 12 close to the teeth 13, cats, dogs and uninvited guests will be discouraged by contact with the sharp points 12 and 13. The pail is provided at its top with an annularly reinforced rim 15 and with a pair of bail engaging brackets 16 having openings 17 in which the ends 18 of a bail 19 are pivotally received.

A cover 20 is provided for the pail, such cover is movable relative to the pail, and may be cut from a flat sheet of metal in a circular form with a V-shaped segment removed and the adjacent edges of the metal brought together to provide the conical shape of the cover, such cover having relatively short axis and being of a larger diameter than that of the pail to provide a substantial overhang to form a shelter for the quail. The cover is intended to serve additionally as a guard and for this purpose is provided with a saw-toothed edge which teeth provide piercing points adapted to be engaged by uninvited and unwanted animals and fowl. The cover is of relatively thin sheet metal, but is provided with annular ribs 20' and 20" which add strength and rigidity to the cover.

The cover and pail may be fastened together by providing opposed spaced slots 22 in the cover through which the brackets 16 of the pail may be inserted, the bail 19, of course, having been previously removed and replaced after the parts are assembled. Instead of using the end of the bail 19 as a latch pin, a nail or spike 36 may be employed, held by a chain 37 fastened to the hood or cover 20.

The device which has been described may be carried by the bail 19 or it may be suspended in a different position by such bail, suitable suspension means being illustrated in Fig. 6 wherein a screw eye and nut 23 is attached to a horizontal arm 24 supported by an upright post 25, it being obvious that the screw eye 23 may be attached to any desired support for suspending the device in a position of use or elsewhere.

Instead of suspending the device as illustrated it may be supported on a post 26, as in the previously mentioned patent, by providing a receiving sleeve 27 the ends of which are provided with threads 28 and 29 engaged by locking member 30 by means of which the sleeve 27 is fixed to the bottom 10 and a transverse brace 31 located across the upper end of the pail. The post 26 is preferably of one inch outside diameter and the receiving sleeve 27 of a size to receive snugly such sleeve. Sleeve forming tubes of these small particular diameters are not readily available, but have been found desirable because among other things they prevent an animal from engaging the cover at its outer edge or the cover and container in some other manner and raising it until the post and sleeve are disengaged, it having been found that when there is a space between the sleeve and post sufficiently to permit slightest movement, it is possible for an animal to separate the device from the support.

In the manufacture of the invention a ready made pail may be used having bail receiving brackets and a bail, or a pail may be used having only one bracket or no brackets depending upon convenience and costs. Instead of brackets 16 which form a part of a conventional pail, a bar 31 may be used having upturned bail forming ends 32 provided with bail receiving openings 33. As seen in Fig. 4 the bar 31 is secured by means of welding or soldering 34 to the upper edge of the side wall 11. In Fig. 5 the bar 31 extends through a suitable opening 35 below the rim 15.

If desired the bail and hood or cover may be fastened together by a hinge 15' at one side of the pail fastened to the cover by means of rivets 15'', such hinge extending through a slot 11' in the upper wall of the pail and around the reinforcing rim 15 of the pail.

A conventional bail 19 may be engaged in the openings 17 or 33 after the parts are assembled to secure them in such relation. Instead of the bail 19 being inserted through the openings 17 or 33 the nail 36 may be employed and such nail may be carried by the chain 37 attached to the roof or hood 20 for holding the parts in assembled relation.

Where the device is to be suspended, an eye bolt 38, such as that shown in Fig. 8 may be employed along with fastening nuts 39, the eye bolt being employed in supporting the device from the bar 24.

In the manufacture of the device, the notches 21 are cut in the periphery of the roof or cover, the operation of cutting them having been delayed to prevent injury during the manufacture of the device due to the sharpness of the notches.

It will be apparent from the foregoing that a quail feeder either of the swinging or the stationary type may be provided at low cost for efficiently forming the functions for which it was designed and will discourage theft of the feed by uninvited guests.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A feeder for quail or the like comprising a container including a transverse bottom and surrounding side wall, said side wall including at least one inwardly extending portion terminating in a downwardly disposed jagged edge portion spaced above said bottom and defining an opening in said side wall to prevent direct lateral access into said container, said side wall including an upwardly disposed transverse jagged edge portion bordering said opening and defining a continuation of said first mentioned jagged edge portion to further insure against direct lateral access into said container, a pair of upstanding opposed bracket portions on said side wall having aligned transverse openings, a cover having spaced transverse openings removably receiving said bracket portions therethrough with the transverse openings of the bracket portions overlying said cover, and means engaging said transverse openings in said bracket portions and overlying the cover for retaining the same in position on the container.

2. The structure of claim 1 in which said bottom includes an upper convex surface intersecting said side wall and extending beneath said inwardly extending portion and said opening for insuring the flow of feed beneath and toward said opening.

3. The structure of claim 1 in which said means comprises a bail member including aligned inwardly turned terminal end portions removably received within said openings of said bracket portions for facilitating carrying or suspending the feeder.

4. The structure of claim 1 including an elongated brace mounted transversely of the upper edge of the container, opposite ends of said brace comprising said bracket portions.

5. The structure of claim 4 including a tubular sleeve secured to and vertically extending centrally between said bottom and said brace and removably received on a vertical support post.

6. A feeder for quail or the like comprising a container including a transverse bottom and surrounding side wall, said side wall including at least one inwardly extending portion terminating in a downwardly disposed jagged edge portion spaced above said bottom and defining an opening in said side wall to prevent direct lateral access into said container, said side wall including an upwardly disposed transverse jagged edge portion bordering said opening and defining a continuation of said first mentioned jagged edge portion to further insure against direct lateral access into said container, a pair of opposed securing portions projecting from said side wall having openings therein, a cover having annular reinforcing means increasing the strength and rigidity thereof and having an opening removably receiving at least one of said portions, and means engaging the opening in one of said portions and overlying the cover for retaining the same in position on the container.

References Cited in the file of this patent

UNITED STATES PATENTS

| 2,216,511 | Copeman | Oct. 1, 1940 |
| 2,277,420 | Stanfield | Mar. 24, 1942 |
| 2,666,415 | Scruggs | Jan. 19, 1954 |
| 2,789,534 | Landgraf | Apr. 23, 1957 |